April 3, 1945.  F. L. WILLRODT  2,372,870
MACHINE FOR GATHERING AND STACKING MATERIALS
SUCH AS HAY AND THE LIKE
Filed Sept. 14, 1942   6 Sheets-Sheet 1
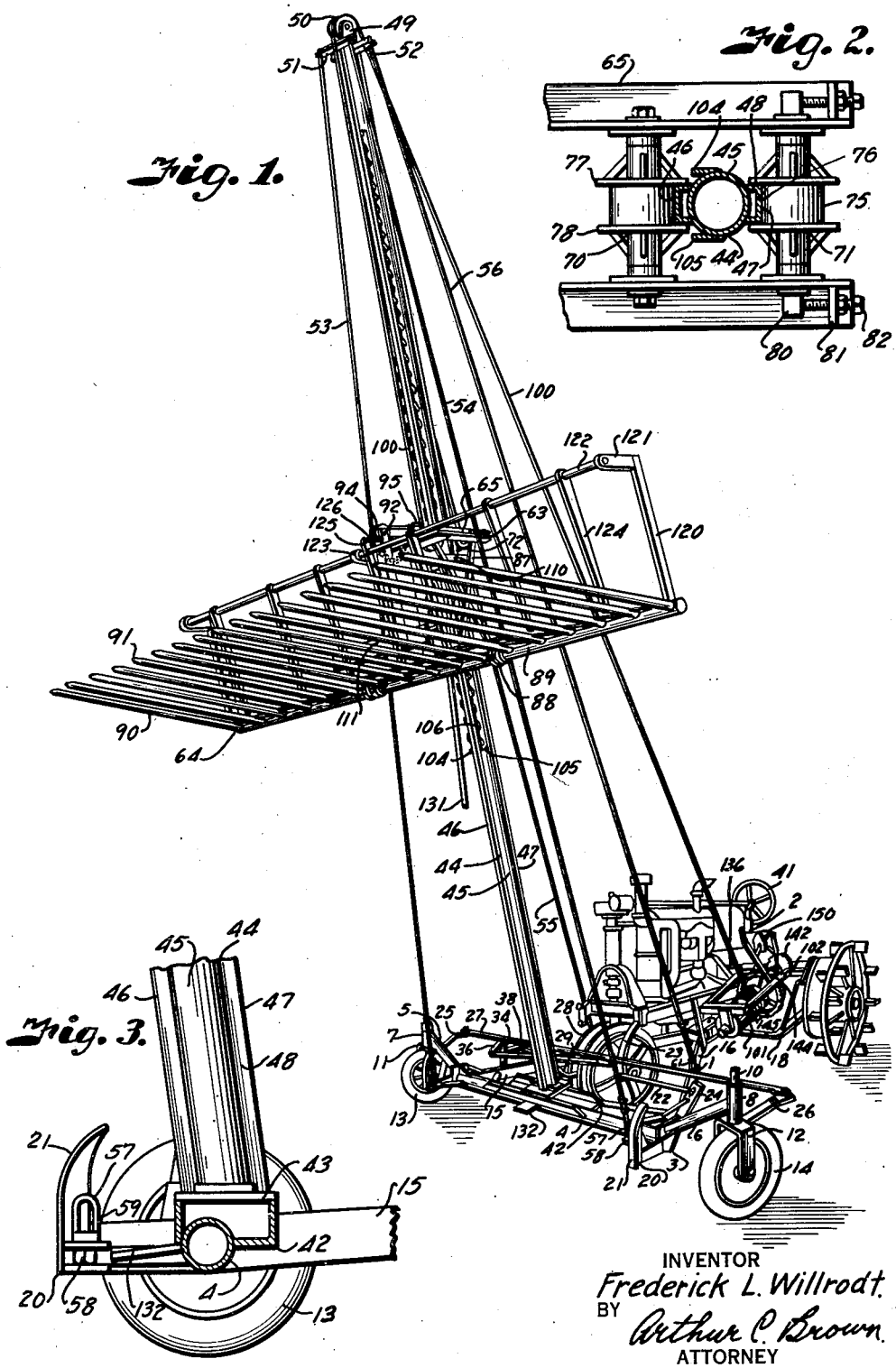
INVENTOR
Frederick L. Willrodt.
BY
Arthur C. Brown.
ATTORNEY April 3, 1945.   F. L. WILLRODT   2,372,870
MACHINE FOR GATHERING AND STACKING MATERIALS
SUCH AS HAY AND THE LIKE
Filed Sept. 14, 1942   6 Sheets-Sheet 3

INVENTOR
Frederick L. Willrodt.
BY Arthur C. Brown
ATTORNEY

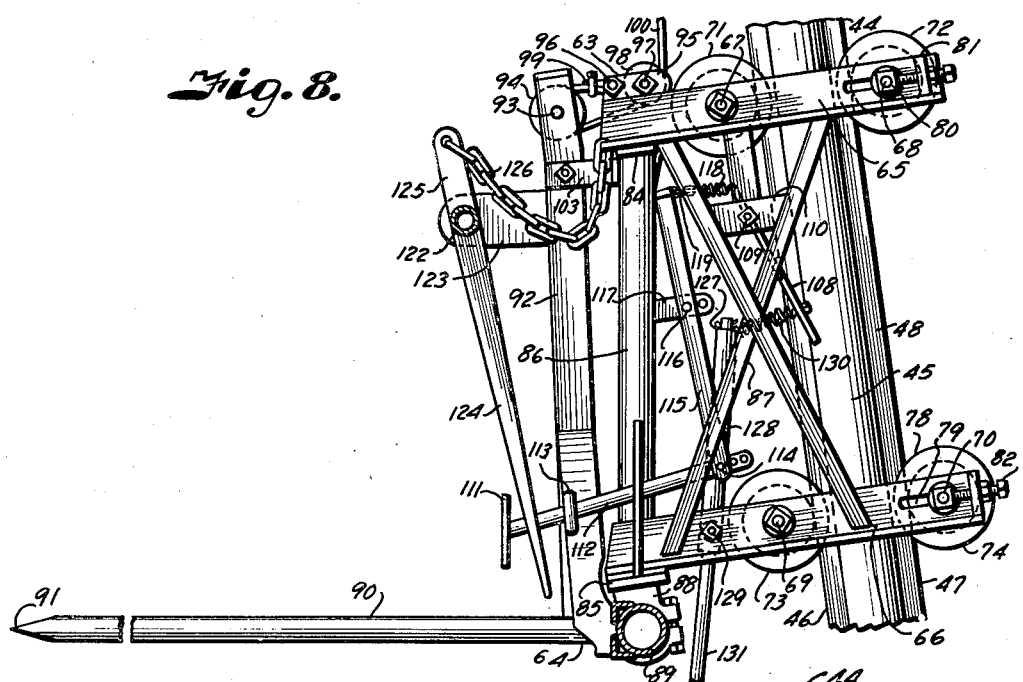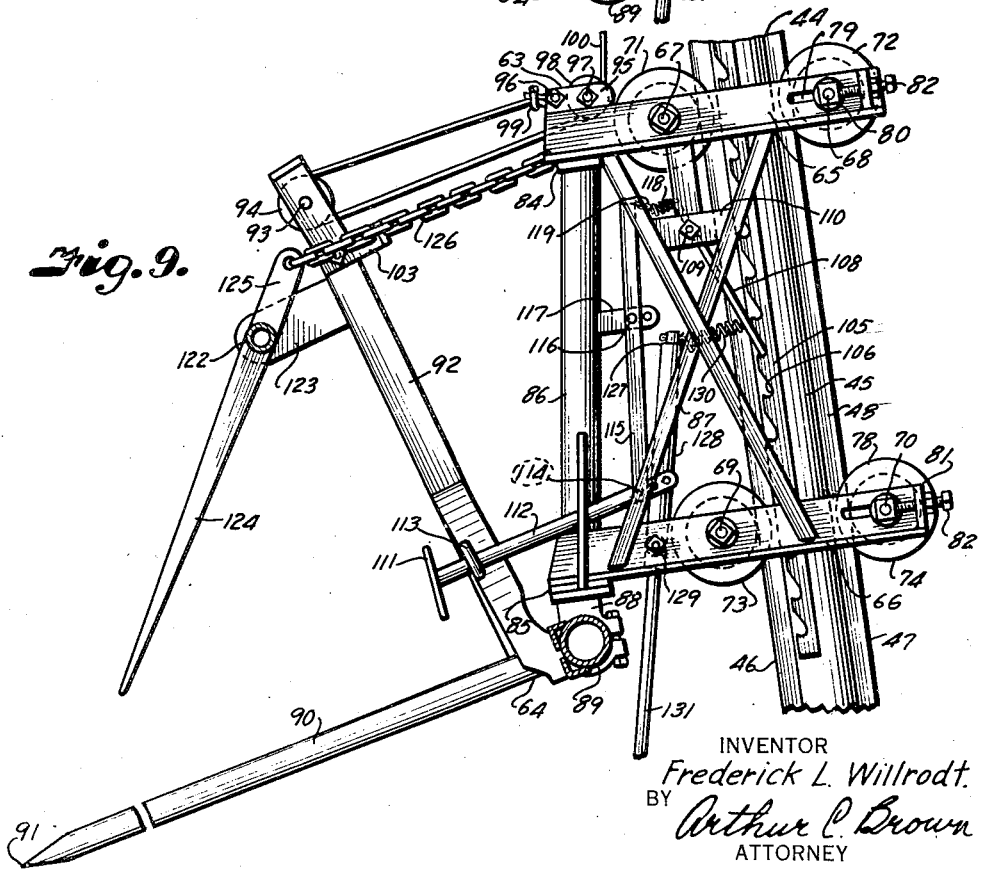

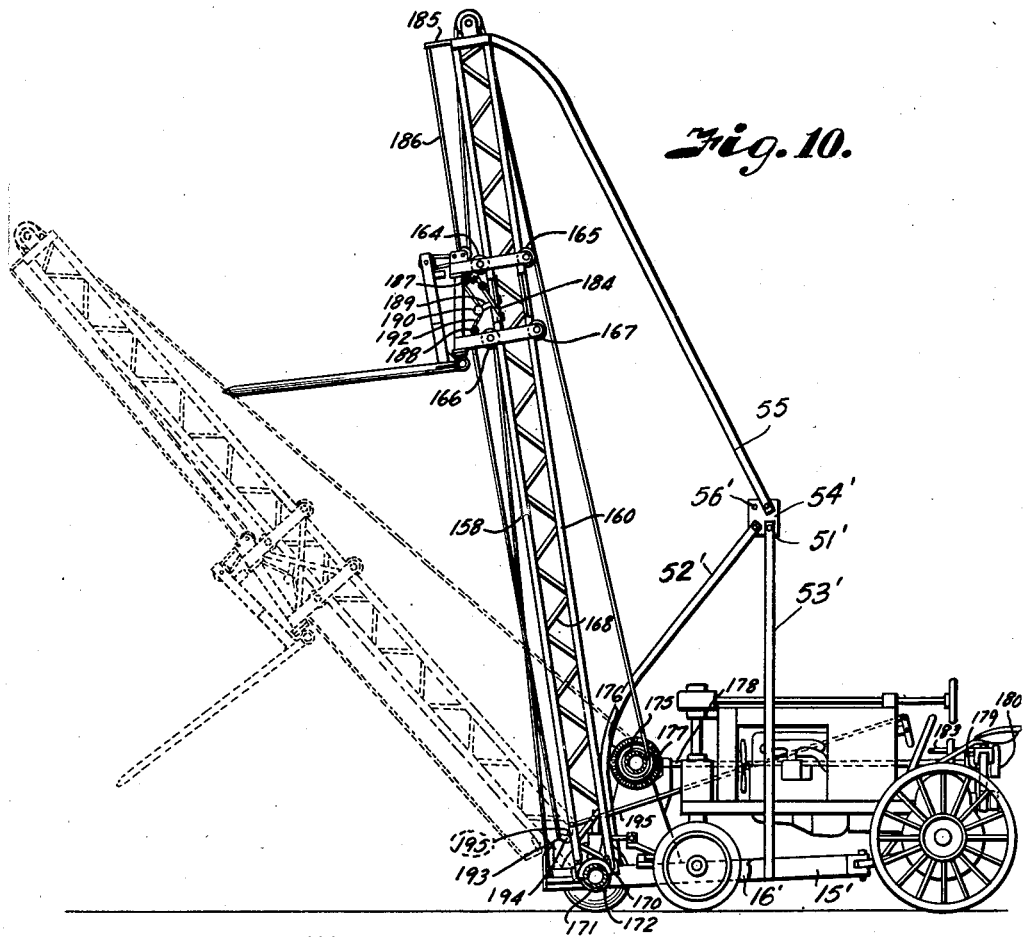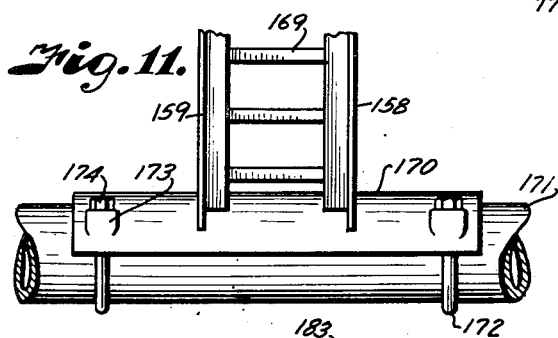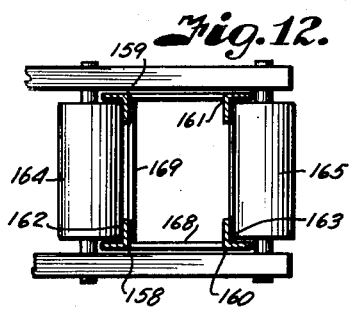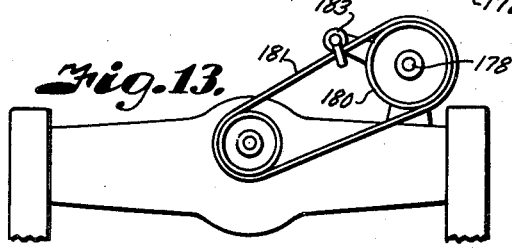

April 3, 1945.  F. L. WILLRODT  2,372,870
MACHINE FOR GATHERING AND STACKING MATERIALS
SUCH AS HAY AND THE LIKE
Filed Sept. 14, 1942  6 Sheets-Sheet 6
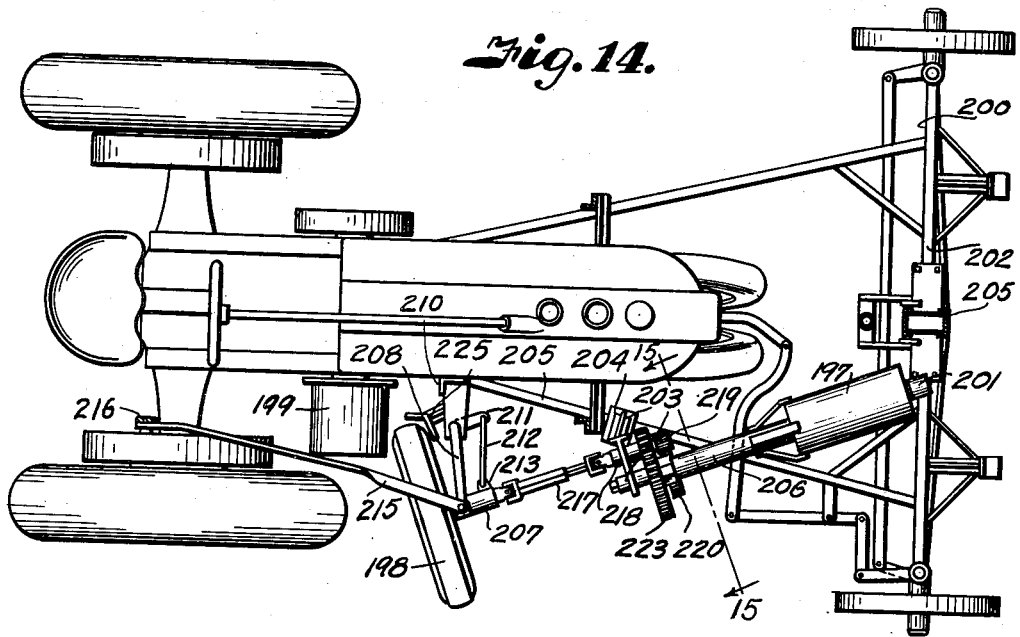
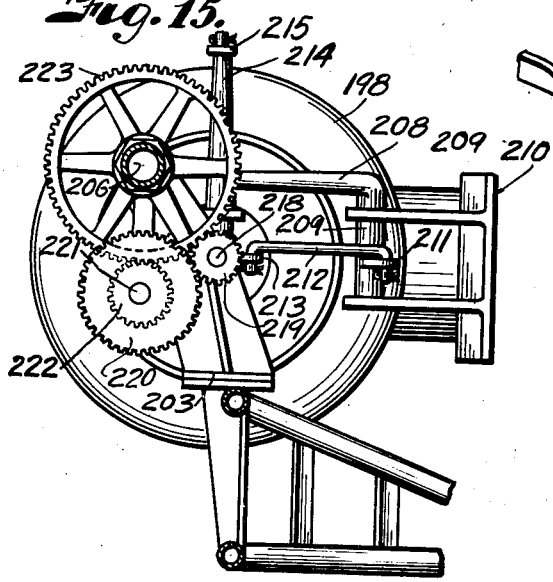
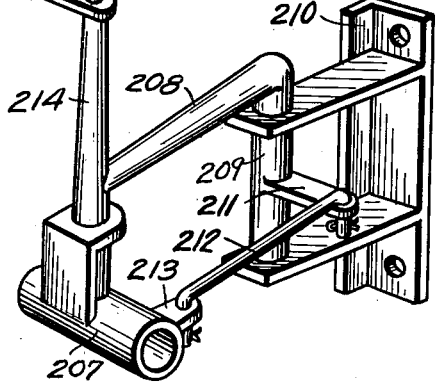
INVENTOR:
Frederick L. Willrodt
BY Arthur C. Brown
ATTORNEYS.

Patented Apr. 3, 1945

2,372,870

UNITED STATES PATENT OFFICE 2,372,870

MACHINE FOR GATHERING AND STACKING MATERIALS SUCH AS HAY AND THE LIKE

Frederick L. Willrodt, Omaha, Nebr.

Application September 14, 1942, Serial No. 458,296

28 Claims. (Cl. 214—113)

This invention relates to a machine for gathering and stacking materials such as hay and the like, and has for its principal object to provide a machine of this character that is exceptionally mobile and adapted to handle large quantities of materials in an orderly and facile manner.

Other objects of the invention are to provide a machine that is safe and dependable in operation; to provide the machine as an attachment to a tractor or similar vehicle; to provide for supporting direct weight of the machine independently of the tractor; to provide for steering of the machine from the steering mechanism of the tractor so as to promote mobility thereof; to provide the machine with a single boom on which a combination fork, carrier and stacker is mounted; to provide means for lowering the boom when it is necessary to move the machine under wires and other overhead obstructions; to provide for raising the carrier under power of the tractor; to provide for substantially automatic control of the carrier on the boom; and to provide the carrier with means for clearing it of a load when the load is to be discharged therefrom.

Further objects of the invention are to provide a machine that is of strong, light weight construction and which is not destructive to the wheel bearings and other parts of the tractor to which it is connected.

In accomplishing these and other objects of the invention, hereinafter pointed out, I have provided improved structure, the preferred forms of which are illustrated in the accompanying drawings, wherein:

Fig. 1 is a perspective view of a machine constructed in accordance with the present invention.

Fig. 2 is a cross-section through the boom illustrating mounting of the carrier thereon.

Fig. 3 is a cross-section through the axle of the machine.

Fig. 8 is a side elevational view of the carrier showing the teeth thereof in load carrying position.

Fig. 9 is a similar view showing the teeth of the carrier in position for dumping the load therefrom.

Fig. 10 is a side elevational view of a modified form of the invention.

Fig. 11 is a detail view of the boom mounting employed in the modified form shown in Fig. 10.

Fig. 12 is a cross-section through the boom of the modified form of machine showing mounting of the carrier thereon.

Fig. 13 is an end view of the tractor showing the power take-off for actuating the winding drum employed in the modified form of machine.

Fig. 14 is a plan view of a machine embodying the features of the invention, but which is equipped with a modified form of power transmitting mechanism.

Fig. 15 is a section on the line 15—15 of Fig. 14.

Fig. 16 is a fragmentary perspective view of the arms which support the friction wheel.

Figure 4:
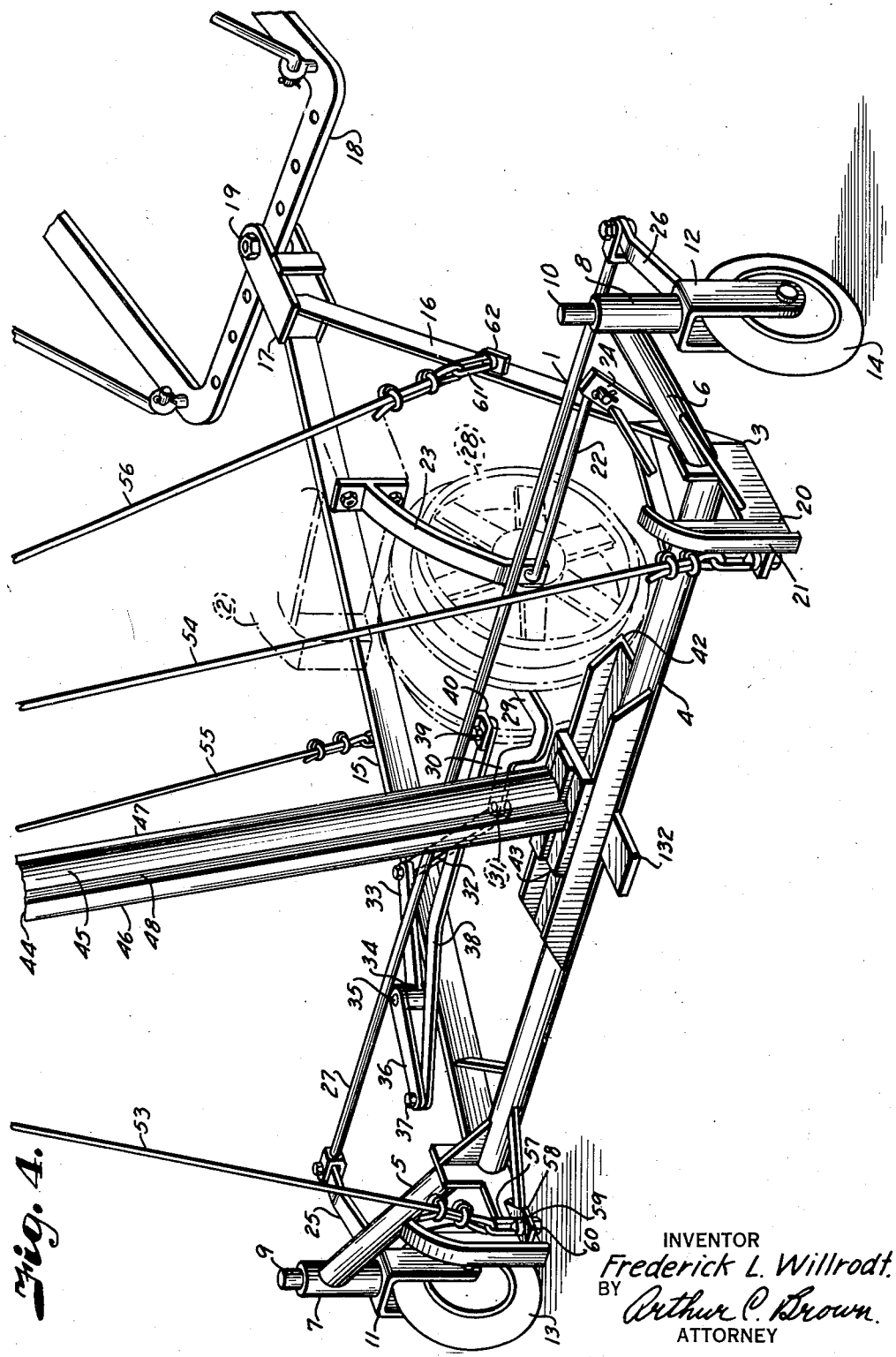
Fig. 4 is an enlarged perspective view of the lower portion of the machine showing the front of the tractor in dotted lines.

Referring more in detail to the drawings, and first to the form of the invention illustrated in Figs. 1 to 9 inclusive:

1 designates a machine constructed in accordance with the present invention, and which is designed for attachment to the front of a tractor 2. The machine includes a frame 3 having a transversely arranged axle 4 provided with upwardly diverging ends 5 and 6 carrying steering knuckle bearing sleeves 7 and 8. Journalled in the bearings 7 and 8 are kingpins 9 and 10, carrying forks 11 and 12 in which are rotatably mounted ground wheels 13 and 14. Attached to the ends of the axle 4 are rearwardly converging side bars 15 and 16 connected at their terminal ends by a clevis-like yoke 17 adapted to connect with the drawbar or other attaching member 18 of the tractor, by means of a bolt or pin 19 extending through the central opening of the drawbar as shown in Fig. 4.

Extending forwardly of the arms 15 and 16 are guide shoes 20 having upwardly curving face flanges 21 forming an abutment for the carrier when the carrier is in loading position, later described. The frame thus described is kept in longitudinal alignment with the tractor by a link 22 having one end pivotally connected with a depending arm 23 attached to the front of the tractor frame and the other to a bracket 24 attached to the side bar 16. With this arrangement the frame 3 may rock laterally with respect to the tractor for freely following the contour of the ground, but it is tied to the tractor and co-operates with the drawbar connection to maintain fore and aft alignment.

Extending rearwardly from the wheel forks 11 and 12 are steering arms 25 and 26 interconnected by a tie rod 27 which effects simultaneous turning thereof responsive to turning of the front wheels 28 of the tractor through a guide arm 29 that is attached to the front axle of the tractor and extends forwardly between the wheels and terminates in a lateral extension 30 in the direction of the side bar 15, as shown in Fig. 4. The extension 30 is pivotally connected, as at 31, with one end of a link 32, having its opposite end connected with an arm 33 of a steering lever 34. The steering lever 34 is pivotally supported on a pin 35 that is carried by the side bar 15, as shown in Fig. 4. The steering lever 34 also includes a forwardly extending arm 36 that is pivotally connected as at 37 with a drag link 38, the opposite end of the drag link being pivotally connected as at 39 with a bracket 40 fixed to the tie rod 27. It is thus obvious that when the tractor wheels are turning to the right or the left, the arm 33 of the steering lever 34 moves in a corresponding direction through the link 32 to swing the other arm 36 in the opposite direction and effect lateral shifting movement of the tie rod 27 to effect turning of the ground wheels 13 and 14 in the same direction as the tractor wheels are turned. The various levers are, of course, proportioned so that the proper turning radius for the ground wheels 13 and 14 is effected and the machine is caused to follow movements of the tractor as controlled by the operator thereof through the steering wheel 41.

Fixed to the axle, midway the length thereof, is a boom supporting bracket 42 to which is attached a base plate 43 that is fixed to the lower end of a boom 44. The bracket is preferably positioned relative to the axle so that the boom inclines somewhat in a forward direction, as shown in Figs. 1 and 4. In the illustrated instance, the boom includes a tubular body portion 45 which may be formed of pipe section, and to the front and rear sides thereof are attached guide tracks 46 and 47. The guide tracks may be channels arranged with the flanges 48 thereof welded to the pipe. The boom may be of any suitable length, depending upon the use of the machine. For example, if the boom is used in handling hay, the boom will be of sufficient height so that a carrier mounted thereon may be raised to a height above that of the stack to be formed, as later described.

The upper end of the machine carries a pulley bracket 49 supporting a pulley 50 with the axis thereof extending parallel with the axle 4. Fixed to the pulley bracket, or otherwise attached to the upper end of the boom, are transversely arranged arms 51 and 52, to the ends of which are attached guys 53—54 and 55—56. The lower ends of the front guys 53 and 54 are attached to eye-bolts 57 that are adjustably positioned in ears 58 projecting laterally from the forwardly extending shoes 21 on the facing sides thereof, as shown in Fig. 4. The shanks 59 of the eye-bolts extending through the ears 58 are threaded and provided with nuts 60 whereby the guys may be adjusted to position the boom perpendicularly with respect to the ends of the axle, whereby the boom is supported in a plane extending through the central longitudinal axis of the tractor when the machine is moving in a straight away direction. The lower ends of the rear guys 55 and 56 are similarly attached to eye-bolts 61 adjustably mounted in ears 62 carried by the side bars 15 and 16 at points spaced rearwardly from the axle. It is thus apparent that the guys 53 and 54 cooperate with the guys 55 and 56 to support the boom in a fore and aft direction.

The support of the boom just described is an important part of the present invention in that it enables the use of a single boom which is rigidly supported to mount the carrier, and provides a light weight construction so that the machine is freely mobile and adapted to be readily manipulated over the ordinary field without wabbling of the boom.

Movably supported on the boom is a carriage 63, supporting a carrying fork 64 for movement up and down the boom so that the fork may be used in gathering up windrows and carrying the gathered material so that it may be elevated and deposited on a stack, as later described. The carriage 63 includes upper and lower pairs of bars 65 and 66 which are preferably angle-irons extending transversely of the boom and carrying axles 67—68 and 69—70 therebetween for rotatably supporting wheels 71—72 and 73—74. The wheels have faces 75 engaging the web portions 76 (Fig. 2) of the guide tracks 46 and 47, and flanges 77 and 78 engaging the side flanges 48 so as to limit lateral movement of the carriage as it is moved up and down the boom. The axles 67 and 69 carrying the wheels 71 and 73 which engage the front track 46 are preferably fixed relative to the bars 65 and 66, however, the axles 68 and 70 carrying the wheels engaging the rear track of the boom have their ends adjustably supported in slots 79 formed in the rear ends of the bars, as best shown in Figs. 8 and 9. The ends of the axles carry clamping nuts 80 so that when the wheels are in adjusted position the axles may be clamped to the bars. In order to facilitate adjustment of the axles in the bars, the rear ends of the bars are provided with laterally extending ears 81 in which are mounted adjusting bolts 82, having their shanks engaging the nuts 80 securing the axles so that when the bolts are turned in the ears 81 they adjust the rear wheels to and from the rear guide track 47 to remove any play that may result from wear. The front ends of the bars 65 and 66 project forwardly and are connected by cross-bars 84 and 85 and the cross-bars 84 and 85 are, in turn, connected by a post 86. The post 86 thus spaces and connects the wheel supports, and in order to enhance lateral rigidity the upper and lower pairs of bars are interconnected by crossed braces 87 as shown in Figs. 8 and 9. Depending from the ends of the lower cross-bar 85 are bearing brackets 88 rotatably supporting a transversely extending, preferably tubular, shaft 89 to which is attached a plurality of spaced teeth 90 of substantial length and having shaped ends 91 whereby the teeth constitute a fork for handling hay or similar materials as later described.

Fixed to the shaft 89, in registry with the post 86, is an upwardly extending arm 92. Journalled on a pin 93 at the upper end of the arm 92 is a grooved pulley 94. Carried by the upper cross-bar 84, in substantially vertical alignment with the pulley 94, are spaced plates 95 carrying front and rear cross-pins 96 and 97. Journalled on the cross-pin 97 is a pulley 98 and fixed to the front pin 96 is the end 99 of a lifting cable 100. The cable operates over the pulley on the arm 92 and under the pulley 98, upwardly along the boom and over the pulley 50 at the top thereof from whence the cable extends downwardly and is wound on a winding drum 101 carried by a frame 102 attached to the side of the tractor as later described.

When the cable 100 is taut and under load of the carriage, a stop 103 on the arm 92 is retained in abutting engagement with the post 86 to support the fork in substantially horizontal position. However, when the cable is slackened the fork is free to swing downwardly under the weight thereof so as to dump a load carried thereby when the carriage is supported in fixed position relatively to the boom. In order to support the carriage in fixed position to allow pivoting of the fork the sides of the boom are provided with rack bars 104 and 105, Figs. 1, 2 and 9, the rack bars each having a series of notches forming seats 106 which are engaged by pawls 107 and 108 pivotally mounted on a cross-rod 109 carried by plates 110 attached to the respective cross-braces 87, as best shown in Figs. 8 and 9. The pawls 107 and 108 are adapted to engage the rack bars when the fork is loaded. This is effected by means of a press plate 111 supported in position to be engaged by the material moved onto the fork, the press plate being supported by rods 112 loosely supported in eyes 113 projecting from the respective sides of the arm 92. The rear ends of the rods project beyond the post 86 and are adjustably connected, as at 114, with the lower end of a rock lever 115. The rock lever 115 is pivotally connected, as at 116, with a lug 117 projecting rearwardly from the post 86. The upper end of the rock lever terminates adjacent the upper ends of the pawls and connects therewith by means of a yieldable connection comprising springs 118 having ends connected with the pawls and their opposite ends connected by means of a chain 119 with the rock lever. Thus when the material accumulates on the fork and presses against the plate 111, the supporting rods 112 are shifted through the eyes 113 to effect rocking of the lever 115 in an anti-clockwise direction exerting a pull on the springs 118 to cause the lower ends of the pawls 107 and 108 to move into latching engagement with the notches 106 of the rack.

It is thus apparent that whenever the fork is loaded, the pawls are in position to engage the rack and when the cable 100 is unwound from the winding drum responsive to weight of the fork, the cable pays over the pulleys 98 and 94 to allow the arm 93 to drop away from the post and the fork to swing downwardly for dumping a load carried thereon. When the load is dumped, the fork may be returned to its original position by winding the cable on the drum which moves the arm 9 until the lug thereon engages the post 86. Should the winding of the cable be continued, the cable will then pick up and raise the carriage on the boom. When the fork is cleared of its load, the pawls 107 and 108 are dropped to perpendicular position and are now free of the racks so that when the cable is again unwound from the drum the carriage is lowered on the boom.

In order to facilitate discharge of the load from the fork, the ends of the fork shaft 89 carry upwardly extending arms 120, having forwardly extending terminals 121 carrying a cross-shaft 122 which also extends through a forwardly extending arm 123 attached to the arm 92. Fixed to and depending from the shaft 122 is a plurality of sweeps 124 arranged so that the lower ends thereof are adapted to move over the teeth of the fork and push the load therefrom. The sweep nearest the arm 92 has an upper extension 125 which is connected by a chain or other flexible connection 126 with the frame of the carriage. Therefore, when the fork is to be unloaded and the cable slacked off so that the fork swings downwardly with respect to the carriage, the chain 126 tightens, as shown in Fig. 9, to effect rocking of the shaft 122 and movement of all the sweeps 124 toward the forward ends of the fork teeth to push the load therefrom and promote clearing thereof when the fork is to be unloaded.

At times it may be desirable, when stacking hay and the like, to lower the loaded fork onto the top of the stack and to back the fork away from the stack leaving the load. Since the pawls 107 and 108 are held in engagement with the racks whenever the fork is loaded, it would be impossible to lower the loaded fork onto the top of the stack. I therefore provide automatic means for withdrawing the pawls from engagement with the notches so that when the machine is in position before a stack, the fork may be lowered onto the stack. This is effected by means of a rocker arm, 127, which includes an upper tubular section 128 pivotally supported, as at 129, between the lower pair of bars 66 on the carriage, and which is of sufficient length so that the upper end thereof extends above the lower ends of the pawls so that the pawls may be connected by yielding connections 130. Slidable in the tubular section is a rod section 131 of sufficient length so that the lower end thereof is adapted to depend along the side of the stack and to press thereagainst when the machine is moved up to the stack. When the lower end of the rod section 131 engages the stack, the tubular section is caused to rock forwardly and effect withdrawal of the pawls from engagement with the racks. Therefore, as long as the rod section 131 is pressing the stack, the carriage may be lowered so that the fork is close to or may rest upon the top of the stack. The machine is then backed away so that the load is deposited on the stack.

Figure 5:
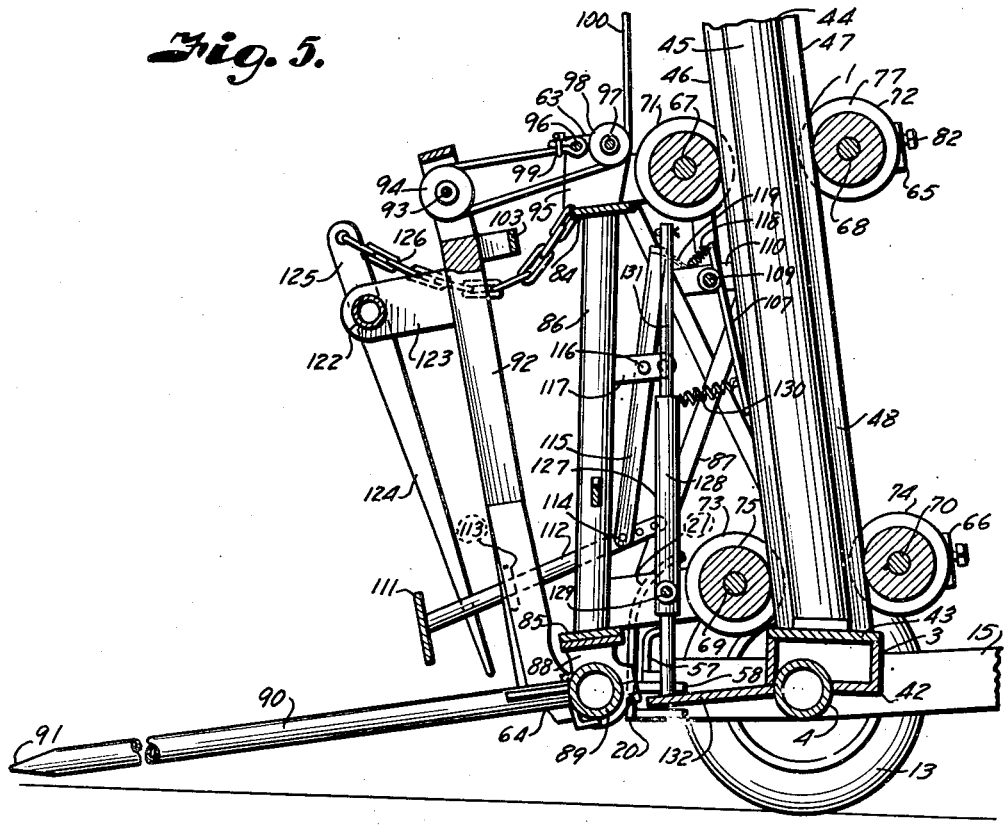
Fig. 5 is a vertical section through the lower portion of the machine and carrier, with the carrier in position for loading.

The pawls also constitute a safety factor in case the cable 100 should break or the control of the winding drum become ineffective when the fork is under load. When the fork is moved to ground engaging position, the lower end of the rod section 131 engages the plate 132, which projects forwardly from the axle and prevents it from dragging upon the ground. When the fork is in its lowermost position, the rod simply telescopes through the tubular section 128 as shown in Fig. 5. However, when the fork is raised, the rod section drops to position so that the lower end thereof projects sufficiently below the fork to be in functional position for engaging the stack.

Figure 6:
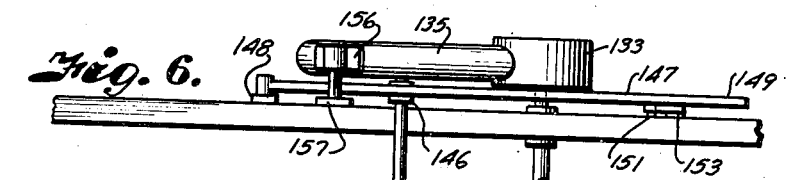
Fig. 6 is a plan view of the winding drum and drive mechanism therefor.
Figure 7:
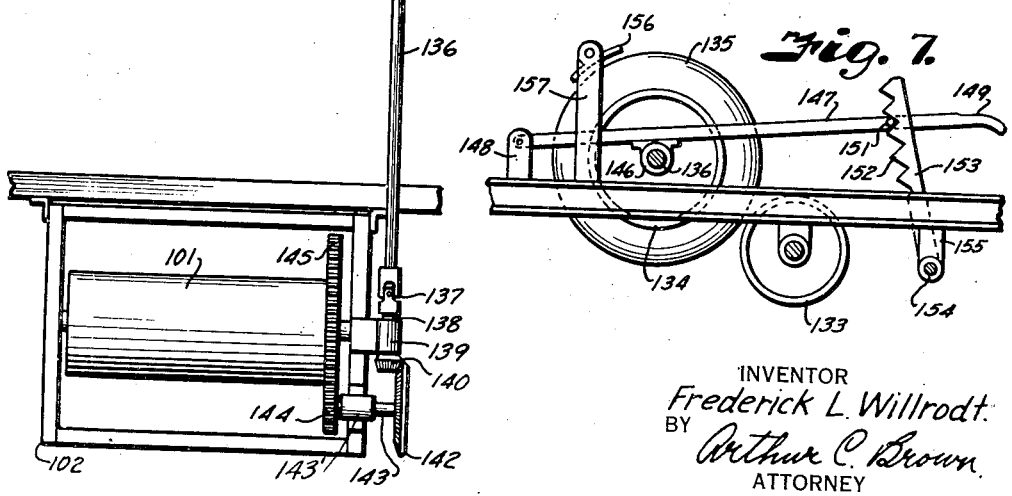
Fig. 7 is a side elevational view of the driving mechanism for the winding drum.

The winding drum 101 is best illustrated in Fig. 6 and the frame 102 is shown attached to the side frame of the tractor. The winding drum is actuated from the power take-off belt pulley 133 (Fig. 7) which is positioned on the opposite side of the tractor. The drive is effected through a friction wheel 134 having a pneumatic tire 135 mounted thereon and adapted to be engaged with the surface of the drive pulley 133 or with a brake shoe 156. The wheel 134 is carried on one end of a countershaft 136 extending transversely of the tractor and having its other end connected with a universal joint 137 which in turn is connected with a stub shaft 138 that is journalled in a bracket 139 attached to the frame 102. The stub shaft carries a bevelled pinion 140 meshing with a bevelled gear 142 on a shaft 143, which shaft is journalled in bearing 143' carried by the winding drum frame. The shaft 143 also has a spur gear 144 meshing with a gear 145 on the winding drum. The end of the shaft 136 which carries the friction wheel 134 is rotatably supported in a bearing bracket 146 attached to a lever 147, which has at one end pivotally connected with a bracket 148 on the tractor frame and its opposite end extends rearwardly of the tractor and terminates in a handle 149 located in convenient position to the driver's seat 150. The lever 147 has a projection 151 extending from the side thereof adapted to engage one of a series of teeth 152 of a retaining pawl 153, the retaining pawl being pivotally mounted, as at 154, to a bracket 155 attached to the tractor frame, the bracket being located so that the pawl moves by gravity into engagement with the projection 151 on the lever 147.

When it is desired to actuate the winding drum, the lever 147 is moved downwardly so that the friction wheel 134 engages the power take-off pulley 133 and the pawl 153 engages the projection 151 to retain the friction wheel 134 in driving contact with the pulley 133. Rotation of the friction wheel 134 through the pulley 133 actuates the winding drum 101 to wind the cable 100 thereon and effect raising of the fork to the desired position. When the fork is to be lowered, the lever 147 is raised so that the friction wheel 134 is lifted from the pulley 133 and brought into engagement with the brake shoe 156 that is carried on a bracket 157 attached to the tractor frame so that the shoe is in position to be engaged by the tire 135 and stop rotation thereof to hold the winding drum and retain the fork in selected position. When the pawl 153 is engaged with the projection 151, the friction wheel will be supported in engagement with the brake shoe 156 so that the operator may release his hold on the lever 147.

In the form of the invention illustrated in Fig. 10, the boom is of box girder construction and includes angle bar corner legs 158, 159, 160 and 161 arranged with selected flanges in facing relation to form front and rear tracks 162 and 163 for the ends of rollers 164—165 and 166—167 which correspond to the flanged wheels previously described in connection with the first form of the invention. The other flanges of the angles engage the end faces of the rollers to retain the rollers in engagement on the tracks. The front and rear legs at the sides of the boom are interconnected with cross-bracing 168 and the respective front and rear legs are interconnected with transverse bars 169. Fixed to the lower end of the boom is a saddle-shaped base 170 that seats on a tubular axle 171 which corresponds to the axle in the first form of the invention. The saddle-shaped base 170 is retained in clamped position on the axle by U-bolts 172 engaging over the axle and extending through ears 173 on the saddle 170 to be retained by nuts 174 threaded onto the shanks of the U-bolts. The boom is supported in erect position by a frame 51' carried by the arms 15'—16'. The frame 51' includes a pair of legs 52' and 53' having their lower ends attached to the arms 15'—16' and their upper ends connected by plates 54'. The upper end of the boom is connected by a brace 55' with the plates 54'. The front corners of the plates are provided with openings 56' to mount a pulley (not shown) for a purpose later described. The advantage of this construction is that the boom may be swung forwardly as shown by the dotted lines in Fig. 10 when it becomes necessary to pass the machine under wires or other overhead obstructions.

In this form of the invention, the winding drum 175 is mounted directly on the carriage of the machine and in front of the tractor, and is operated by a bevelled gear 176 that is connected with the winding drum shaft and which meshes with a pinion gear 177 on a shaft 178 that extends longitudinally along the side of the tractor and which carries a tight and loose pulley 179 and 180 on the rear end thereof to mount an endless belt 181 operating over a power take-off pulley 182 constituting the power take-off of the tractor. The belt is adapted to be shifted to and from the tight pulley so as to effect operation of the winding drum by means of a conventional belt shifter 183. In this form of the invention, the pawls 184 which support the trolley in a selected elevation are moved to and from engagement with front cross-bars 169 which connect the front corner members of the boom. In this form of the invention, the pawls are manually disengaged by the operator of the tractor through a mechanism now to be described. Fixed to the upper end of the boom is an arm 185 to which is connected a small cable 186 that extends downwardly of the boom and through fixed eyes 187 and 188 located respectively above and below the pawls. Connected with the pawls is an arm 189 having an eye 190 thereon through which the lifting cable 191 extends. When the pawl is engaged, the eye 190 cooperates with the eyes 187—188 to effect a bight 192 therein, as shown in Fig. 10. The lower end of the cable is connected with one arm 193 of a bell-crank lever 194 pivoted to the lower portion of the boom and which is adapted to be rocked by a reciprocably supported rod 195 connected to the other arm 196 of the bell-crank. When it is desired to release the pawls, the operator pushes on the rod 195 to swing the arm 193 of the bell-crank lever in a downward direction, putting tension on the cable 191 and straightening the bight thereof between the eyes 187 and 188 to effect withdrawal of the pawls from engagement with the bars 169 of the boom.

In the form of the invention illustrated in Figs. 14 to 16 inclusive, the winding drum 197 is carried at the front of the tractor and is operated by a friction wheel 198 from the power take-off pulley 199 of the tractor similar to the power transmitting mechanism illustrated in the first described form of the invention. The winding drum 197 and gearing are carried as a unit on the machine frame 200, the winding drum being journalled in a bearing 201 carried by the axle 202 of the machine and in a bearing 203 carried by a bracket arm 204 mounted on one of the brace arms 205 which connect the axle with the push bar of the tractor. In order that the winding drum may exert a direct downward pull with respect to the pulley at the top of the boom 205' and at the same time accommodate the friction wheel 198 so that it may be moved to and from driving relation with the pulley 199 the axis of rotation of the winding drum extends at an angle with respect to the longitudinal center line of the tractor, as clearly shown in Fig. 14. Also associated with the winding drum 197 which operates the lifting cable is a smaller drum 206 which operates a cable used in raising and lowering the boom, as later described.

The friction wheel 198 is journalled in a bearing 207 that is carried on an arm 208 having a spindle portion 209 journalled in a bracket 210 carried by the frame of the tractor. Extending from the spindle 209 is an arm 211 that is connected by a link 212 with an ear 213 projecting from the bearing 207 which assists in retaining alignment of the friction wheel when it is moved to and from engagement with the drive pulley.

In order to shift the friction wheel, the arm 208 carries a vertical post 214 connected by a link 215 with an operating lever 216 supported on the frame of the tractor. The friction wheel shaft is journalled in the bearing 207 and is connected through a telescoping flexible shaft 217 with a shaft 218 journalled in the bracket 203 parallel with the axis of the winding drum. Fixed to the shaft 218 is a pinion gear 219 meshing with a larger gear 220 on a countershaft 221 also carried by the bracket 203. Fixed in driving relation with the gear 220 on the countershaft 221 is a smaller gear 222 meshing with a larger gear 223 fixed in driving connection with the winding drums. The winding drums are thus rotated at a comparatively slower speed than the speed of the friction wheel as effected by the pulley 199. The friction wheel 198 when disengaged from the pulley 199 is caused to engage a brake shoe 225 (Fig. 14) that is also carried by the bracket 210. The structure illustrated in Figs. 14 to 16 is otherwise similar to the structure illustrated in Figs. 10 and 11.

In operating the first described form of machine, the fork 64 may be raised and carried at a sufficient elevation on the boom 44 so that the teeth 90 of the fork will clear obstructions while the machine is being moved to the site of operation. This is effected by causing the winding drum 101 to wind up the cable 100 to lift the fork carriage on the boom 44. When the machine is used in handling hay from windrows, the friction wheel 134 is released from the brake shoe 156 so the winding drum is released and the fork carriage 63 gravitates to the lower end of the boom 44 so that the forward ends of the teeth are supported on the ground. When the fork is in raking position, the lower end of the rod section 131 engages and is supported by the plate 132. The tractor then pushes the machine along the ground so that the teeth gather the hay thereon. As the hay moves along the teeth and is loaded, it will press against the pressure plate 111 so as to effect actuation of the rock lever 115 and draw the pawls 107 and 108 into position so that they will engage the notches 106 of the rack bars 104 and 105 upon lifting of the fork. When a load of desired size has accumulated on the fork, the winding drum 101 is placed in operation so that the cable 100 is wound thereon to lift the fork. The fork is preferably lifted to the point where the pawls will engage the notches of the racks 104 and 105 which provide a safety support in case the cable 100 should break under the load of hay. The machine carrying the load of hay is then moved to the stack on which the load is to be deposited. If the stack is higher than the position that the fork is carried, the friction wheel 134 will again be engaged with the drive pulley of the tractor to effect operation of the winding drum 102 for raising the fork to a position so that it will clear the top of the stack. During this movement, the pawls 104 and 105 will simply ride into and out of the notches of the racks. The machine may then be moved so that the fork projects over the stack. In order to dump the load onto the top of the stack, the winding drum 101 is released to effect unwinding of the cable 100 therefrom so that the cable plays over the pulley at the top of the boom and permits the arm 92 to move away from the post 86 and the teeth of the fork to swing downwardly to a position whereby the hay will slide therefrom. Upon movement of the arm 92 relative to the post 86, the chain 126 will become taut to bring the sweeps 124 into play to assist in discharge of the hay from the fork. After dumping of the hay, the fork is returned to its normal position by engaging the friction wheel from the power take-off pulley of the tractor so that the winding drum again winds the cable 100 thereon. Upon winding of the cable 100, the first movement is to return the teeth of the fork to their load carrying position. As soon as the stop 103 on the arm 92 engages the post 86, the carriage will be raised on the boom. The machine may then be backed away from the stack and the carriage raised to carrying position of the boom. This is readily effected by first causing the winding drum to lift the carriage so that the pawls 107 and 108 will drop out of engagement with the notches of the racks.

The form of the invention shown in Figs. 10 to 13 operates substantially in the same manner as that of the first form with the exception that release of the pawls 184 is effected manually by the operator of the tractor. In case it is desired to lower the boom so that the machine may pass under wires or other overhead obstructions, a pulley is journalled in the opening 56' of the plates 54' and the winding drum cable is reeved over the pulley. The brace 55' is then disconnected from the plates 54', then when the winding drum is released the cable will unwind therefrom and allow the boom to swing forwardly into the dotted line position shown in Fig. 10. After the obstruction has been passed the winding drum is again connected with the power take-off mechanism of the tractor so that the cable winds thereon to lift the boom to its original position, whereupon the brace 55' is reconnected with the plates 54'. The winding drum cable is then removed from the pulley carried by the plates 54' and the machine is again ready for operation.

In operating the structures illustrated in Figs. 14 to 16 inclusive, the friction wheel 198 is normally retained in braking relation with the shoe 225 so that the winding drum 197 is retained from rotation to support the fork in any selected position on the boom. When it is desired to lower the fork, the lever 216 (Fig. 14) is shifted to allow disengagement of the wheel 198, whereupon the winding drum is adapted to rotate under weight of the fork. When it is desired to raise the fork, the friction wheel is moved into contact with the pulley 199 so that the flexible shaft 217 rotates the shaft 218, which in turn rotates the winding drum through the gears 219, 220, 222 and 223. When it is desired to lower the boom as described in connection with Fig. 10, the winding cable is removed from the drum 197 and applied to the smaller drum 206. This increases the effective leverage on the lifting cable and provides for slower movement of the boom when being raised and lowered to and from an erect position.

When the machine is to be removed from the tractor the frame is uncoupled from the push bar of the tractor and the tractor backed therefrom, the sections of the telescoping shaft 217 slipping apart leaving the winding drum unit and gearing upon the machine.

From the foregoing it is obvious that I have provided a machine which is adapted for rapid handling of hay and other similar materials. It is also obvious that the machine is exceptionally mobile and capable of handling large quantities of material in an orderly and facile manner. It is also obvious that the principal weight of the machine is carried on the ground wheels 13 and 14 and is substantially independent of the tractor. The only thrusts acting on the tractor are simply those tending to prevent overturn of the boom. The steering connection of the wheels 13 and 14 with the steering wheels of the tractor also facilitates maneuvering of the machine over a field and renders it so that it may be turned in relatively small spaces and steered into position when approaching stacks or moving in and around obstructions in a field. It is also obvious that the machine is of strong, light weight construction, safe to operate, and capable of handling hay and similar materials so as to eliminate the use of rakes, hay racks, and other paraphernalia usually used in harvesting hay.

While I have particularly described the machine for harvesting hay, it is obvious that it may be used in handling other materials which are adapted to be carried from one place to another and lowered or elevated as the particular use of the machine demands.

What I claim and desire to secure by Letters Patent is:

1. A machine of the character described including, a mobile frame, a boom supported substantially perpendicular on said frame, a carriage having a movable support on the boom, a toothed fork pivotally mounted on the carriage to move from load carrying to load discharging position, means for raising and lowering the carriage on the boom and for supporting said fork in load carrying position, said means being arranged to release said fork to load discharging position, sweeps pivotally supported on the fork and having ends movable over the teeth of the fork for facilitating discharge of said load, and a flexible connection between the sweeps and carriage for actuating the sweeps responsive to movement of the fork to load discharging position.

2. A machine of the character described including, a mobile frame, a boom supported substantially perpendicular on said frame, a rack carried by the boom, a carriage having a movable support on the boom, a fork pivotally mounted on the carriage to move from load carrying to load discharging position, means for raising and lowering the carriage on the boom for supporting said fork in load carrying position and to release said fork to load discharging position, a pawl on the carriage and adapted to engage said rack for supporting the carriage when the fork is unloaded, sweeps movable over the fork for facilitating discharge of said load, and means for actuating the sweeps responsive to movement of the fork to load discharging position.

3. In a machine of the character described, a mobile frame, a boom supported on the frame, a carriage having movable support on the boom, a fork pivotally mounted on the carriage to move from load carrying to load discharging position, a pulley at the upper end of the boom, a pulley having fixed rotatable mounting on the carriage, a winding drum having fixed support, a cable operating over the pulleys and having one end connected with the carriage and the other wound on the winding drum to raise and lower the carriage on the boom, and a pulley carried by the fork and engaging a bight in said cable between the pulley on the carriage and the end of the cable that is fixed to said carriage for supporting the fork in load carrying position upon tightening of the cable and for releasing the fork to load discharging position when the weight of the carriage is relieved from said cable.

4. In a machine of the character described, a mobile frame, a boom supported substantially perpendicular on the frame, a carriage having movable support on the boom, a fork pivotally mounted on the carriage to move from load carrying to load discharging position, an arm carried by the fork, a stop on the carriage to be engaged by said arm, a pulley on said arm, a pulley on the carriage, a pulley at the upper end of the boom, a winding drum having fixed support, a cable operating over the pulleys and having one end connected with the carriage and the other wound on the winding drum to raise and lower the carriage on the boom, said arm being retained against said stop when the weight of the carriage is on said cable, and latch means on the carriage adapted to engage a part of the boom for supporting the carriage in a selected position on the boom to permit said arm on the fork to move away from said stop and the fork to pivot responsive to unwinding of the cable when the fork is to be moved to discharging position.

5. In a machine of the character described, a mobile frame, a boom supported substantially perpendicular on the frame, a carriage having movable support on the boom, a fork pivotally mounted on the carriage to move from load carrying to load discharging position, an arm carried by the fork and engageable with a fixed part of the carriage for a stop, a pulley at the upper end of the boom, a pulley on said arm, a pulley on said carriage, a winding drum having fixed support, a cable operating over the pulleys and having one end anchored to the carriage and the other wound on the winding drum to raise and lower the carriage on the boom and to support the arm of the fork against said part of the carriage to retain said fork in load carrying position upon tightening of the cable, and latch means for supporting the carriage in a fixed position on the boom to carry the load of the carriage independently of said cable, whereby unwinding of the cable from the drum causes the fork to pivot downwardly on its pivotal connection.

6. In a machine of the character described, a mobile frame, a boom supported substantially perpendicular on the frame and having latch engaging portions along the height thereof, a carriage having movable support on the boom, a fork pivotally mounted on the carriage to move from load carrying to load discharging position, an arm carried by the fork and engageable with a part of the carriage, a pulley at the upper end of the boom, a pulley on said arm, a pulley on said carriage, a winding drum having fixed support, a cable operating over the pulleys and having one end anchored to the carriage and the other wound on the winding drum to raise and lower the carriage on the boom and to support the arm of the fork against said part of the carriage to retain said fork in load carrying position upon tightening of the cable, latch means on the carriage adapted to engage any of said latch engaging portions for supporting the carriage in a fixed position on the boom to carry the load of the carriage independently of said cable, whereby unwinding of the cable from the drum causes the fork to pivot downwardly on its pivotal connection, and means for selectively operating said latch means.

7. In a machine of the character described, a mobile frame, a boom supported substantially perpendicular on the frame, a carriage having movable support on the boom, a fork pivotally mounted on the carriage to move from load carrying to load discharging position, a pulley at the upper end of the boom, a winding drum having fixed support, an arm on the fork adapted to engage the carriage, a pulley on said arm, a pulley on the carriage, a cable operating over the pulleys and having one end anchored to the carriage and the other wound on the winding drum to raise and lower the carriage on the boom, latch means for supporting the carriage in a fixed position on the boom to carry the load of the carriage when the cable is unwound from the drum to cause the fork to be moved to discharging position, and means responsive to load on the fork for effecting engagement of said latch means with the boom.

8. In a machine of the character described, a mobile frame, a boom supported substantially perpendicular on the frame, a carriage having movable support on the boom, a fork pivotally mounted on the carriage to move from load carrying to load discharging position, a pulley at the upper end of the boom, a winding drum having fixed support, a cable operating over the pulley and having one end connected with the carriage and the other wound on the winding drum to raise and lower the carriage on the boom, means carried by the fork and having connection with the cable for supporting the fork in load carrying position upon tightening of the cable and for releasing the fork to load discharging position when the weight of the carriage is relieved from said cable, latch means for supporting the carriage in a fixed position on the boom to carry the load of the carriage when the fork is to be moved to discharging position, means responsive to load on the fork for effecting engagement of said latch means with the boom, and means depending from the carriage and adapted to engage the side of an object on which a load is adapted to be discharged to effect release of said latch means.

9. In combination with a tractor having front steering wheels and means for steering said wheels, said tractor having a push bar to the rear of said steering wheels, a mobile frame including an axle, wheels having steering knuckle connection with the ends of the axle, side bars having ends connected with ends of the axle and adapted to be connected pivotally with the push bar of the tractor, a steering mechanism connecting said wheels, means connecting said steering mechanism with the steering mechanism of the front wheels of the tractor, and means having pivotal connection with the frame and with the tractor for retaining the mobile frame aligned with the tractor.

10. A unit adapted for connection with a tractor having front steering wheels, means for steering said wheels and a draft bar, including an axle, wheels having steering knuckle connection with the ends of the axle, a boom supported substantially perpendicular on the axle, side members having ends connected with ends of the axle and adapted to be connected with the draft bar of the tractor, a steering mechanism connecting said wheels, means adapted for connecting said steering mechanism with the steering mechanism of the front wheels of the tractor, means connected with the upper end of the boom and with said side members to support said boom in said substantially perpendicular position, a fork movable up and down the boom, a winding drum supported on one of said side members, a cable having connections with the fork and operable over the upper end of the boom and wound on said drum, and driving means for the winding drum adapted to be connected with the tractor.

11. A unit adapted for connection with a tractor having front steering wheels, means for steering said wheels, and a draft bar including an axle, wheels having steering knuckle connection with the ends of the axle, a boom supported substantially perpendicular on the axle, side members having ends connected with ends of the axle and adapted to be connected with the draft bar of the tractor, a steering mechanism connecting said wheels, means adapted for connecting said steering mechanism with the steering mechanism of the front wheels of the tractor, means connected with the upper end of the boom and with said side members to support said boom in said substantially perpendicular position, a link having pivotal connection with one of the side members and adapted to be connected with the tractor to retain the axle in alignment with the tractor, a fork movable up and down the boom, a winding drum, a cable having connection with the fork and operable over the upper end of the boom and wound on said drum, and driving means for the winding drum adapted to be connected to the tractor.

12. In a machine of the character described, a mobile frame, a boom supported substantially perpendicular on the frame, tracks on the front and rear sides of said boom, a carriage having rollers mounted on said tracks, a fork pivotally mounted on the carriage to move from load carrying to load discharging position, a pulley at the upper end of the boom, a winding drum having fixed support, a cable operating over the pulley and having one end connected with the carriage and the other wound on the winding drum to raise and lower the carriage on the boom, means carried by the fork and having connection with the cable for supporting the fork in load carrying position upon lifting of the carriage and for releasing the fork to load discharging position when the weight of the carriage is relieved from said cable, latch means for supporting the carriage in a fixed position on the boom to carry the load of the carriage when the fork is to be moved to discharging position, means responsive to load on the fork for effecting engagement of said latch means with the boom, and means depending from the carriage and adapted to engage the side of an object on which a load is adapted to be discharged to effect release of said latch means.

13. In a machine of the character described, a mobile frame, a boom pivotally supported on the frame, means normally retaining the boom in substantially perpendicular position on the frame, a carriage having movable support on the boom, a fork on the carriage, a pulley at the upper end of the boom, a winding drum having fixed rotational support, a cable operating over the pulley and having one end connected with the carriage and the other wound on the winding drum to raise and lower the carriage on the boom, a tractor connected with the frame having a power take-off pulley, a friction wheel, means supporting the friction wheel for movement to and from contact with the power take-off pulley, driving means connecting the friction wheel with the winding drum, means for moving the friction wheel to and from contact with the power take-off pulley, and a second winding drum of smaller diameter than the first mentioned winding drum for reeling the cable when raising and lowering the boom on said pivotal support.

14. In a machine of the character described, a movable frame, a boom pivotally supported on the frame, a carriage having movable support on the boom, a fork pivotally mounted on the carriage, common power means for raising and lowering the carriage on the boom and for pivoting the fork and boom, and a detachable brace connecting the boom with the frame for rendering said power means effective to raise and lower the carriage when the brace is connected and to pivot the boom when the brace is disconnected.

15. In a machine of the character described, a frame, a boom supported on the frame, a carriage, means for mounting the carriage for up and down movement on the boom, pawl engaging portions substantially coextensive with travel of the carriage, a pawl movably supported on the carriage for movement to and from said pawl engaging portions on the boom to stop descent of the carriage and to release the carriage for descent, a fork, means for pivotally mounting the fork on the carriage for movement from a load-carrying position to a load-discharging position, said fork having stop engagement with the carriage in the direction of movement into load carrying position, means for raising and lowering the carriage on the boom and having connection with the fork to retain the fork in said stop engagement with the carriage during up and down movement of the carriage upon release of said pawl, and means for actuating the pawl to engage and disengage the pawl relative to any one of the pawl engaging portions.

16. In a machine of the character described, a frame, a boom supported on the frame, a carriage, means for mounting the carriage for up and down movement on the boom, pawl engaging portions substantially coextensive with travel of the carriage on the boom, a pawl on the carriage adapted to engage said pawl engaging portions on the boom to stop descent of the carriage, a fork, means for pivotally mounting the fork on the carriage for movement from a load-carrying position to a load-discharging position, said fork having stop engagement with the carriage in the direction of movement into load-carrying position, means for raising and lowering the carriage on the boom including a cable, means on the carriage for reeving the cable, means on the fork for engaging said reeved end of the cable to retain the fork in said stopped engagement with the carriage during up and down movement of the carriage upon release of said pawl, and means for releasing the pawl, said cable being movable over said reeving means to permit the fork to move to discharging position when the pawl supports said carriage.

17. In a machine of the character described, a frame, a boom supported on the frame, a carriage, means for mounting the carriage for up and down movement on the boom, pawl engaging portions substantially coextensive with travel of the carriage, a pawl on the carriage adapted to engage said pawl engaging portions to stop descent of the carriage, a fork on the carriage, a pawl control cable substantially coextensive with length of the boom, means on the carriage cooperating with means connected with the pawl for forming a bight in the control cable, and means for tensioning the control cable to actuate said cooperating means for releasing to release the pawl selectively.

18. In a machine of the character described, a frame, means for attaching said frame to a tractor, a boom having its lower end pivoted on said frame and adapted to swing to a position forwardly of said frame, means supporting the boom in substantially vertical position on the frame and adapted to be disconnected when the boom is to be pivoted, a carriage, means mounting the carriage for up and down movement on the boom, a pulley on the upper end of the boom, differential sized winding drums rotatably supported on the frame, a cable connected with said carriage and adapted to be wound on one or the other of said drums, means for operating said drums from a power take-off of the tractor, and means carried by said boom supporting means for reeving the cable when wound on the smaller of said drums to move the boom on said pivot.

19. In a machine of the character described, a frame, a boom supported on the frame, a carriage, means for mounting the carriage for up and down movement on the boom, pawl engaging portions substantially coextensive with travel of the carriage, a pawl on the carriage adapted to engage said pawl engaging portions to stop descent of the carriage, a fork, means for pivotally mounting the fork on the carriage for movement from a load-carrying position to a load-discharging position, said fork having stop engagement with the carriage in the direction of movement into load-carrying position, means for raising and lowering the carriage on the boom including a cable, means on the carriage for reeving the cable, means on the fork for engaging said reeved end of the cable to retain the fork in said stopped engagement with the carriage during up and down movement of the carriage upon release of said pawl, a pawl control cable substantially coextensive with the boom, means on the carriage cooperating with means connected with the pawl for forming a bight in the control cable when the pawl is engaged, and means for tensioning said control cable to selectively release the pawl, said first named cable being movable over said reeving means to permit the fork to move to discharging position when the pawl is engaged.

20. In a machine of the character described, a frame, a boom having the lower end pivotally mounted on said frame, means on said frame normally retaining the boom in substantially vertical position on the frame, a carriage mounted for movement on the boom, a fork pivoted on the carriage, a pulley on the upper end of the boom, differential sized winding drums on the frame, a cable having connection with the fork and said carriage and operable over the pulley at the top of the boom for winding upon one of said drums, a pulley carried by the boom support for reeving the cable when the cable is wound on the smaller of said drums to pivot the boom, a pawl on the carriage engageable with a part of the boom for preventing descent of the carriage when the cable is unwound from said drums, and means for selectively releasing the pawl.

21. In a machine of the character described, a mobile frame, a boom supported on the frame, a carriage, means for mounting the carriage for up and down movement on the boom, pawl engaging portions substantially coextensive with travel of the carriage on the boom, a pawl on the carriage adapted to engage said pawl engaging portions to stop descent of the carriage, a fork, means for pivotally mounting the fork on the carriage for movement from a load-carrying position to a load-discharging position, said fork having stop engagement with the carriage in the direction of movement into load-carrying position, means for raising and lowering the carriage on the boom including a cable, means on the carriage for reeving the cable, means on the fork for engaging said reeved end of the cable to retain the fork in said stopped engagement with the carriage during up and down movement of the carriage upon release of said pawl, and means depending from the carriage and adapted to engage a side of an object on which the load is to be discharged to effect release of the pawl, said cable being movable over said reeving means to permit the fork to move to discharging position when the pawl is engaged with said pawl engaging means.

22. A machine of the character described including a mobile frame, a boom supported on the mobile frame, a carriage, means mounting the carriage for up and down movement on the boom, a load carrier, means mounting the load carrier on the carriage for pivotal movement about a horizontal axis, said load carrier having a portion adapted for stop engagement with a part of said carriage when in load carrying position, and means for raising and lowering the carriage on the boom including a winding drum and a cable having connection with the load carrier to retain the load carrier in said stop engagement when the cable is tensioned by said winding drum.

23. A machine of the character described including a mobile frame, a boom supported on the mobile frame, a carriage, means mounting the carriage for up and down movement on the boom, a load carrier, means for pivotally mounting the load carrier on the carriage, said load carrier having a portion adapted for stop engagement with said carriage when in load carrying position, means for raising and lowering the carriage on the boom including a winding drum and a cable having connection with the load carrier to retain the load carrier in said stop engagement when the cable is tensioned by said winding drum, means on the carriage and having engagement with the boom to stop the carriage from downward movement on the boom, and means for disengaging said boom engaging means to lower the carriage on the boom.

24. A machine of the character described including a mobile frame, a boom supported on the mobile frame, a carriage, means mounting the carriage for up and down movement on the boom, a load carrier, means for pivotally mounting the load carrier on the carriage for movement from a load carrying position to a load discharging position, said load carrier having a portion adapted for stop engagement with a part of said carriage when in load carrying position, means for raising and lowering the carriage on the boom and having connection with the load carrier to retain the load carrier in said stop engagement, sweeps movable over the load carrier for facilitating discharge of a load therefrom, and means for actuating the sweeps responsive to pivotal movement of the load carrier to discharging position.

25. A machine of the character described including a mobile frame, a boom, means supporting the boom substantially perpendicular on the frame, a carriage, means mounting the carriage for up and down movement on the boom, a fork, means pivotally mounting the fork on the carriage to move from a load carrying position to a load discharging position, an arm on the fork and adapted to engage a part of the carriage, a pulley at the upper end of the boom, a pulley on the carriage, a winding drum on the frame, a cable connecting the winding drum with said arm and operating over the pulleys to support said fork in load carrying position when the cable is wound on said drum and to release the fork to discharging position when the cable is unwound from said drum, and means for preventing downward movement of the carriage on the boom when the fork is to be pivoted to said load discharging position.

26. In a machine of the character described, a frame, a boom having the lower end pivotally mounted on said frame, means normally retaining the boom in substantially vertical position, a carriage mounted for movement on the boom, a load carrier pivoted on the carriage, a pulley on the upper end of the boom, a winding drum, a cable having connection with the load carrier and said carriage and operable over the pulley at the top of the boom for winding on said drum to support the load carrier in load carrying position and to raise the carriage on said boom, and a pulley having fixed support for reeving the cable when the boom is to be pivoted on the frame, said boom retaining means being removable from the frame when the boom is to be pivoted on the frame.

27. In combination with a tractor having front steering wheels and means for steering said wheels, a machine for gathering materials such as hay and the like including a frame, wheels having steering connection with the frame, means for pivotally connecting the frame with the tractor, a steering mechanism connecting said last named wheels, means connecting the steering mechanism with the front steering wheels of the tractor, and means connecting the frame with the tractor for retaining said mobile frame centered with respect to the tractor.

28. A machine of the character described including a frame, a boom supported on the frame, a carriage having movable support on the boom, a fork, means pivotally supporting the fork on the carriage, a pulley at the upper end of the boom, a winding drum having fixed rotational support, a cable operating over the pulley and having one end connected with the fork and the other wound on the winding drum to support the fork and to raise and lower the carriage on the boom, a tractor connected with the frame having a power take-off pulley, a friction wheel, means for supporting the friction wheel for movement to and from contact with the power take-off pulley, driving means connecting the friction wheel with the winding drum, and means for moving the friction wheel to and from contact with the power take-off pulley.

FREDERICK L. WILLRODT.